(12) United States Patent
Tan et al.

(10) Patent No.: US 9,383,802 B1
(45) Date of Patent: Jul. 5, 2016

(54) INTEGRATED CIRCUIT WITH STATE AND DATA RETENTION

(71) Applicant: Altera Corporation, San Jose, CA (US)

(72) Inventors: Jun Pin Tan, Kepong (MY); Kiun Kiet Jong, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 323 days.

(21) Appl. No.: 13/922,649

(22) Filed: Jun. 20, 2013

(51) Int. Cl.
*G06F 1/32* (2006.01)

(52) U.S. Cl.
CPC ............ *G06F 1/3234* (2013.01); *G06F 1/3203* (2013.01)

(58) Field of Classification Search
CPC ................................................. G06F 9/44505
USPC .................................................. 713/100, 323
See application file for complete search history.

(56) References Cited

U.S. PATENT DOCUMENTS

| | | | | |
|---|---|---|---|---|
| 5,943,421 A * | 8/1999 | Grabon | ............... | G06F 12/1408 380/269 |
| 6,948,147 B1 * | 9/2005 | New | .................... | G06F 17/5054 716/117 |
| 8,060,767 B1 * | 11/2011 | Wright | ...................... | G06F 1/24 713/320 |
| 8,253,438 B2 | 8/2012 | Hoberman et al. | | |
| 8,286,012 B2 | 10/2012 | Malhi et al. | | |
| 8,806,416 B1 * | 8/2014 | Chan | ................... | G06F 17/5081 716/136 |
| 2002/0162037 A1 * | 10/2002 | Woods | ....................... | G06F 1/32 713/322 |
| 2004/0088630 A1 * | 5/2004 | Arima | .................... | G06F 1/3203 714/744 |
| 2005/0071693 A1 * | 3/2005 | Chun | .................... | G06F 1/3203 713/300 |
| 2009/0067211 A1 * | 3/2009 | Rahman | ................. | G11C 17/18 365/96 |
| 2010/0057950 A1 * | 3/2010 | Barrow | .................... | G06F 13/28 710/22 |
| 2010/0269004 A1 * | 10/2010 | Flynn | ................... | G06F 11/2236 714/746 |
| 2013/0132756 A1 * | 5/2013 | Priel | ..................... | G06F 1/3203 713/324 |

FOREIGN PATENT DOCUMENTS

| | | |
|---|---|---|
| EP | 1256870 | 5/2008 |
| EP | 2199813 | 8/2011 |

\* cited by examiner

*Primary Examiner* — Thomas Lee
*Assistant Examiner* — Volvick Derose (57) ABSTRACT

A method of operating an integrated circuit that includes a plurality of registers may include receiving a sleep mode request for the integrated circuit. The sleep mode request may be a control signal received with control circuitry on the integrated circuit. The plurality of registers may be configured to operate as a scan chain when the sleep mode request is received. Integrated circuit state information that are stored in the plurality of registers may be retrieved by operating the scan chain and stored in a memory module. The integrated circuit may be placed in a sleep mode. Placing the integrated circuit in the sleep mode may reduce power consumption of the integrated circuit.

20 Claims, 5 Drawing Sheets

INTEGRATED CIRCUIT WITH STATE AND DATA RETENTION

BACKGROUND

Integrated circuit devices, such as field-programmable gate arrays (FPGAs), application specific integrated circuits (ASICs), and the like, may be used to implement a variety of functions. For instance, an FPGA device may be configured to perform various user functions based on different user designs. As such, integrated circuit devices are included in a variety of applications and systems.

Oftentimes, such devices may be used in systems that require efficient power management. One of the more common ways to reduce power consumption in a system (or device) is to power down the system when it is not in use (or at least place the system in a reduced power consumption state). This is especially crucial in systems with repeated active and inactive operation cycles. For instance, in a sensor system (e.g., door sensor, alarm sensor, motion sensor, etc.), the system may be idle until an event is detected. Such a system may therefore be powered down, or at least put in a reduced power consumption mode, when idle in order to reduce unnecessary power consumption.

SUMMARY

Circuitry and techniques for reducing power consumption and retaining state information in an integrated circuit are provided. Embodiments of the present invention include circuits and techniques that allow an inactive integrated circuit to be powered down without losing configuration data or state information.

It is appreciated that the present invention can be implemented in numerous ways, such as a process, an apparatus, a system, or a device. Several inventive embodiments of the present invention are described below.

A method of operating an integrated circuit may include receiving a sleep mode request for the integrated circuit. The sleep mode request may be sent by a user or may be initiated by sensor circuitry after a predefined period of inactivity. The integrated circuit may include multiple registers. Each register may be configurable to operate in a scan mode. Accordingly, the plurality of registers may be configured to operate as a scan chain in response to receiving the sleep mode request. Integrated circuit state information stored in the multiple registers in the integrated circuit may be retrieved by operating the scan chain (e.g., by shifting values stored in the registers through the scan chain). The retrieved integrated circuit state information may be stored in a memory module. The integrated circuit may then be placed in a sleep mode to reduce power consumption.

A method of operating an integrated circuit may include switching the integrated circuit from a user mode to a scan mode. Specific operations of the integrated circuit may be controlled by control circuitry of the integrated circuit (e.g., switching the integrated circuit from one operating mode to another). Core registers in the integrated circuit may be electrically coupled to form a chain of core registers when the integrated circuit is switched to the scan mode. The control circuitry may then shift core register data from the chain of core registers to a memory module. The integrated circuit may be placed in a reduced power consumption state when the core register data have been shifted to the memory module.

An integrated circuit may include registers in a core region, control circuitry and a non-volatile memory module. The registers in the core region may be coupled to each other through interconnects. As an example, the interconnects may couple the registers to form multiple register chains based on an operating mode (e.g., when the integrated circuit is placed in scan mode or test mode) of the integrated circuit. The multiple register chains formed may be coupled to the control circuitry through the plurality of interconnects. Register data may be shifted from each of the register chains to the non-volatile memory module that is coupled to the control circuitry when the integrated circuit is being placed in a dormant state (e.g., a reduced power consumption state).

DETAILED DESCRIPTION

The embodiments provided herein include circuitry and techniques to power down an integrated circuit (IC) and restore the IC to its previous known state upon power up.

It will be obvious, however, to one skilled in the art, that the present exemplary embodiments may be practiced without some or all of these specific details. In other instances, well-known operations have not been described in detail in order not to unnecessarily obscure the present embodiments.

The embodiments described herein may be used in ICs and systems, where a previously known state (i.e., the state before the system or IC is powered down) is restored as part of a power up operation that restores the system or IC to a fully operational mode after a power down operation. Typically, integrated circuit devices, as used in a wide variety of systems, may not be able to retain their previous state once they are powered down.

As an example, even though an integrated circuit device such as a field programmable gate array (FPGA) device may be able to retain its configuration data when powered down, it typically is not able to retain its state information (e.g., specific values held by registers and memory cells in the device) when it is powered down. Accordingly, in order to restore a device or system to its operational state prior to being powered down, it may be necessary to restore such state information when power is restored to the system or IC.

Figure 1:
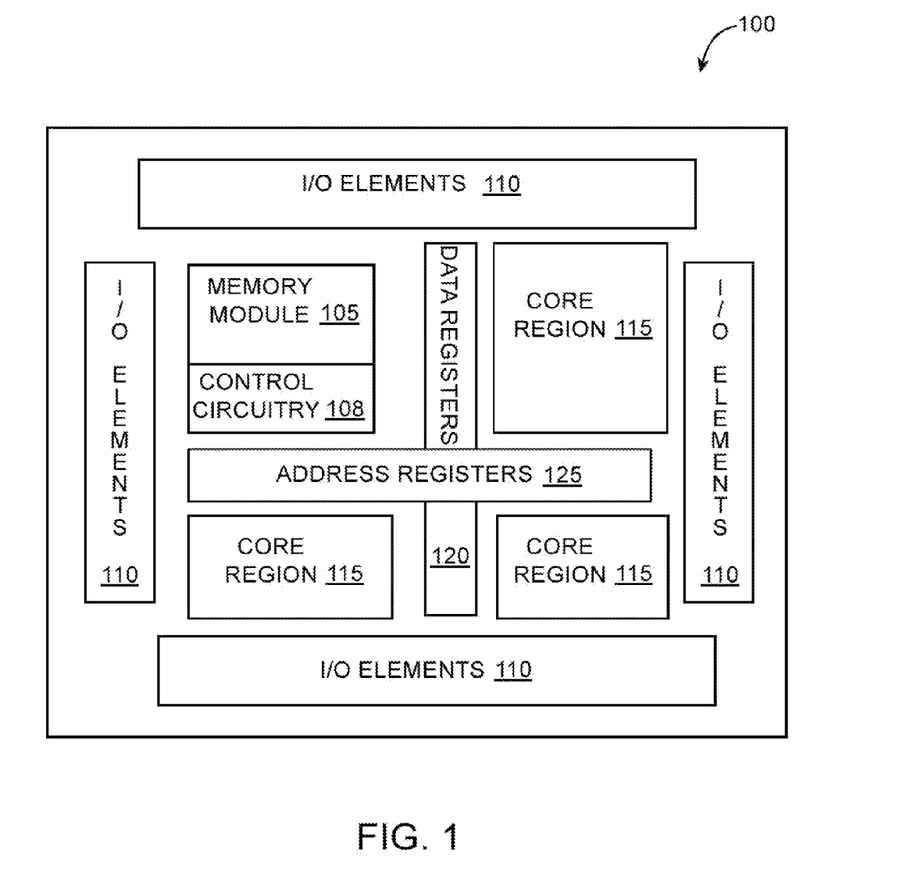
FIG. 1 is a simplified block diagram of an integrated circuit in accordance with one embodiment of the present invention.

An IC device such as a field-programmable gate array (FPGA) device, generally includes, among others, memory modules, logic blocks, clock generation circuitry, and input-output elements. FIG. 1, meant to be illustrative and not limiting, shows a simplified block diagram of IC 100 that can implement embodiments of the present invention. IC 100 includes multiple core logic regions 115 and input-output elements 110. Other auxiliary circuits, such as phase-locked loops (PLLs), for clock generation and timing (not shown in the embodiment of FIG. 1), can be located outside core logic regions 115 (e.g., at corners of IC 100 and adjacent to input-output elements 110).

Each core logic region 115 may be populated with logic cells that may include "logic elements" (LEs) or core registers, among other circuits. The LEs may further include look-up table-based logic regions and may be grouped into "Logic Array Blocks" (LABs). The LEs and groups of LEs or LABs can be configured to perform logical functions desired by the user.

Core logic regions 115 may further include random access memory elements, such as static random access memory (SRAM) cells, configuration RAM (CRAM), look-up table RAM (LUTRAM) cells, that may be used to hold configuration data and provide different logic signals. Configuration data loaded into configuration memory may accordingly be used to produce control signals that configure any of the LEs and groups of LEs and LABs to perform desired logical functions. For instance, CRAM or SRAM cells may contain values of control signals for selector circuits or multiplexing circuits to route signals between different logic blocks. Data registers 120 and address registers 125 (the details of which are not shown in order to not unnecessarily obscure the present invention) may be used to route signals to and read data from different memory cells within IC 100.

Signals received from external circuitry at input-output elements 110 may be routed from input-output elements 110 to various core logic regions 115 or other logic blocks on IC 100. The core logic regions 115 (or more specifically, the LEs or core registers within core logic regions 115) may perform functions based on the signals received. Accordingly, signals may be sent from any of the various core logic regions 115 and other relevant logic blocks of IC 100 to other external circuitry or components that may be connected to IC 100 through input-output elements 110. It should be appreciated that a single device like IC 100 can potentially support a variety of different interfaces and each individual input-output bank 110 can support a different input-output standard with a different interface or protocol (e.g., high-speed serial interface protocol).

Memory module 105 may be a non-volatile memory module that may be used to store the contents (e.g., a previous known state, configuration data, etc.) of IC 100 when IC 100 is in a reduced power consumption state (or, in certain instances, completely powered down). Control circuitry 108 may be coupled to memory module 105 and other blocks within IC 100 (e.g., any of core logic regions 115, data registers, etc.). In one embodiment, control circuitry 108 may contain circuit elements that implement a state machine for placing IC 100 in a dormant state (or a quiescent state). Control circuitry 108 may therefore generate appropriate control signals to transfer configuration data and relevant state information from the various memory cells (more specifically, RAM elements) and core registers, respectively, in core logic regions 115 to memory module 105 before powering down IC 100 or placing it in the dormant state.

Figure 2:
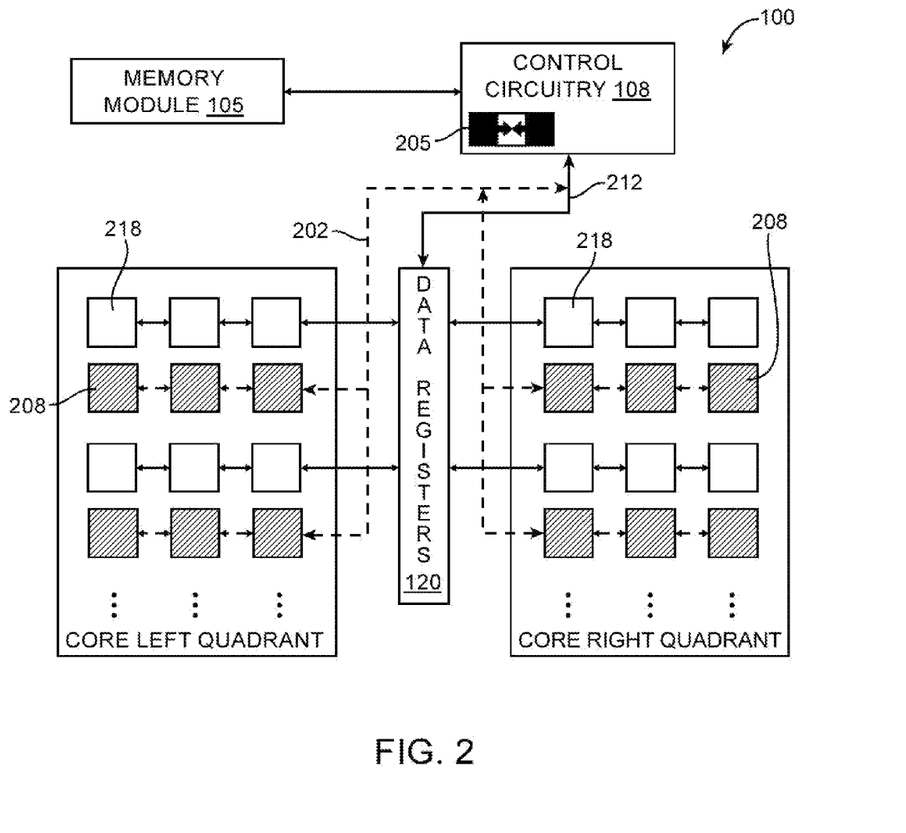
FIG. 2 shows illustrative scan traces and data/address lines that couple core registers and random access memory elements, respectively, to control circuitry on an integrated circuit in accordance with one embodiment of the present invention.

FIG. 2 shows illustrative scan traces 202 and data/address lines 212 that couple core registers 208 and RAM elements 218, respectively, to control circuitry 108 in accordance with one embodiment of the present invention. It should be appreciated that RAM elements 218 may be SRAM or ERAM cells that may be used to store different variable values in IC 100. In the embodiment of FIG. 2, two core regions (e.g., right and left quadrants) with multiple rows of core registers 208 and RAM elements 218 are shown. It should be appreciated that other logic or core regions in IC 100 may not be shown in FIG. 2.

When a sleep mode request is received by control circuitry 108 (e.g., when IC 100 has been idle for a specific period of time, when a particular event is detected, when control circuitry 108 receives a user input or request to power down IC 100, etc.), IC 100 may be placed in a non-user mode. In one embodiment, IC 100 may be placed in a scan mode to engage scan traces 202. It should be appreciated that scan traces 202 may be metal traces that connect one core register 208 to another to form a chain (or multiple chains) of core registers 208 and may not be engaged when IC 100 is in a normal operating state (e.g., during user mode or active state). As shown in the embodiment of FIG. 2, when core registers 208 are coupled through scan traces 202, each core register 208 is coupled to its adjacent core register (e.g., the output from one register is transmitted to an adjacent core register).

It should be appreciated that during normal operating mode (e.g., when IC 100 is active), core registers 208 may be configured to implement specific user functions (or may collectively form a state machine in a user design). As such, scan traces 202 may not be engaged and core registers 208 may not be chained together to form multiple register chains. For instance, depending on the user design, different core registers 208 may be coupled together to form a group (or groups) of registers. That is to say, output from one core register may not necessarily be transmitted to an adjacent register.

In one embodiment, IC 100 may include at least two different sets of interconnects or metal traces where one set of interconnects (not shown) is engaged during user mode (e.g., normal operation) and another set of interconnects (e.g., scan traces 202) is engaged during scan mode (e.g., during testing or non-user mode). As an example, multiplexing circuits may be used to selectively engage different sets of interconnects depending on the particular mode of operation of IC 100.

As core registers 208 may be configured to implement different user designs or functions, at any point in time during operation, each core register 208 may contain specific data signals. These signals may collectively be referred to as state information (e.g., information on the specific state of a particular core register in IC 100 at any one time) of the IC. Accordingly, when core registers 208 are "chained" together (e.g., coupled sequentially to one another) through scan traces 202, data from core registers 208 may be shifted or transferred to memory module 105 through the newly formed register chains to control circuitry 108, and subsequently transmitted to memory module 105.

In the embodiment of FIG. 2, when a sleep mode request is received by control circuitry 108, apart from state information or core register data, RAM data from RAM elements 218 may also be transferred to memory module 105. As shown in FIG. 2, RAM elements 218 are coupled to data registers 120 through data/address lines 212. Accordingly, when the sleep mode request is received by IC 100 (or more specifically, by control circuitry 108), RAM data from RAM elements 218 may be shifted to data registers 120. Control circuitry 108 may then read the RAM data from data registers 120 before transferring the data to memory module 105.

IC 100 may be placed in a dormant state or a reduced power consumption state after state information (e.g., a previous known state of IC 100) from core registers 208 and RAM data from RAM elements 218 have been stored in memory module 105. In one embodiment, memory module 105 is a non-volatile memory module and as such, data and information store in memory module 105 may not be lost even when IC 100 is placed in a reduced power consumption state.

While IC 100 is placed in a dormant state or a reduced power consumption state, IC 100 may receive a wake-up request signal (e.g., when a specific event is detected, when a user input is received, etc.). Accordingly, stored state information and RAM data in memory module 105 may be restored, respectively, to core registers 208 and RAM elements 218 such that IC 100 may be placed in an active state and restored to its previous known state. As an example, if IC 100 was at state X when it received a sleep mode request, IC 100 may continue operating from state X once a wake-up request is received and IC 100 is powered up again.

In the embodiment of FIG. 2, control circuitry 108 may also include compression/decompression circuitry 205 that compresses register data or RAM data before the data is transferred to and stored at memory module 105. Accordingly, register data and RAM data that may be stored in memory module 105 may be decompressed by compression/decompression circuitry 205 before they are restored to the respective core registers 208 and RAM elements 218. It should be appreciated that various well-known compression and decompression techniques may be applicable in this context and in order to not unnecessarily obscure the present invention, specific compression details are not shown and described here.

Figure 3:
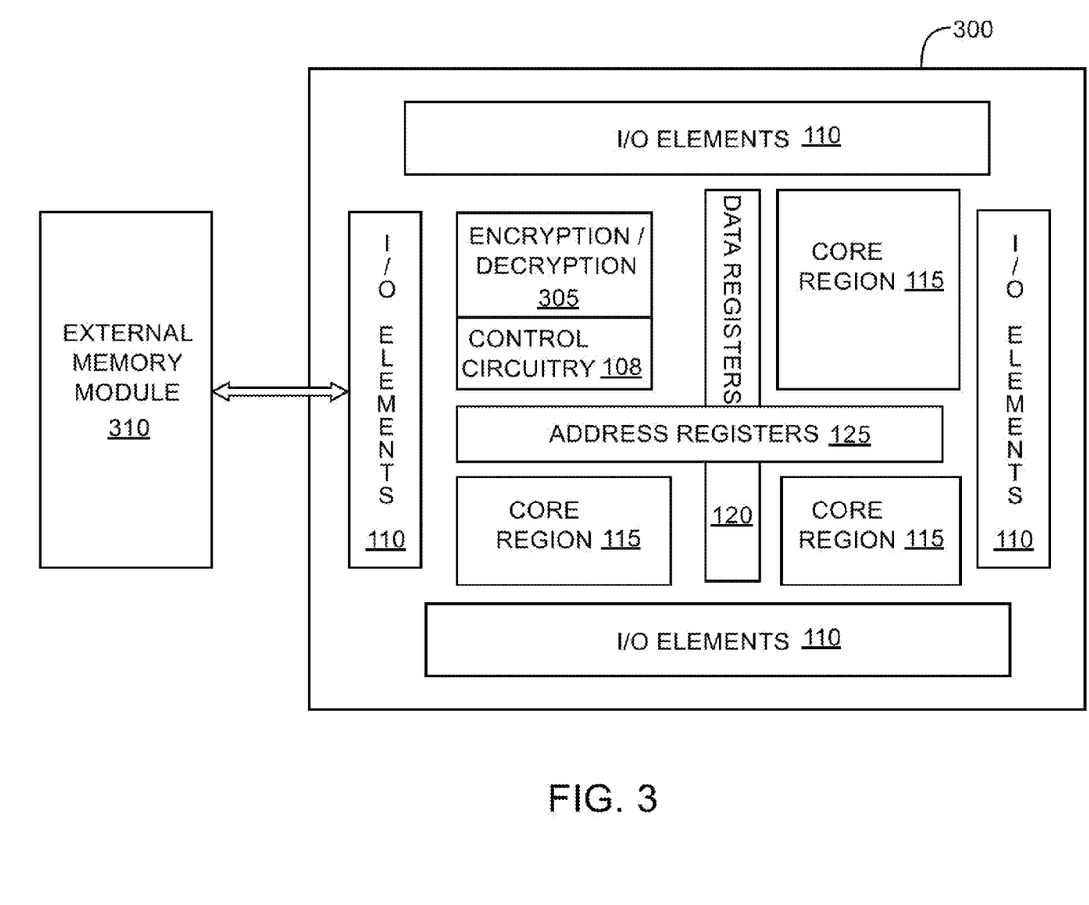
FIG. 3 shows an illustrative integrated circuit coupled to an external memory module in accordance with one embodiment of the present invention.

FIG. 3 shows illustrative IC 300 coupled to external memory module 310 in accordance with one embodiment of the present invention. It should be appreciated that IC 300 shares similarities with IC 100 and as such, for the sake of brevity, elements that have been described above (e.g., input-output elements 110, data registers 120, address registers 125, core regions 115, control circuitry 108, etc.) will not be described in detail again. Circuitry for encryption and decryption (e.g., encryption/decryption circuit 305) may be included in IC 300.

Encryption/decryption circuit 305 may be coupled to control circuitry 108 and may be used to encrypt core register data from registers in any of the core regions 115 in IC 300 or RAM data from RAM elements in IC 300 (not shown in FIG. 3).

As described above with reference to FIG. 2, register data from core registers 208 and RAM data from RAM elements 218 may be transferred to memory module 105 through control circuitry 108 when IC 200 is being placed in a dormant state. Accordingly, state information that may be stored in and associated with the core registers (and RAM information in RAM elements) in core regions 115 in IC 300 may be transmitted to external memory module 310. In one embodiment, external memory module 310 may be a non-volatile memory module coupled to IC 300. In another embodiment, external memory module 310 may be an external volatile memory module that may still be powered to hold its stored data even when IC 300 has been powered down.

In the embodiment of FIG. 3, encryption/decryption circuit 305 may encrypt data from IC 300 (e.g., core register data, RAM data, etc.) before the encrypted data is transferred to external memory module 310. Once the encrypted data have been transferred to external memory module 310, IC 300 may be placed in a reduced power consumption state. When IC 300 is being activated (e.g., when IC 300 receives a wake-up request signal, etc.), the stored encrypted data may be transferred from external memory module 310 back to IC 300. Accordingly, encryption/decryption circuit 305 may decrypt the encrypted data and IC 300 may be restored to its previous known state when the decrypted data have been restored to the respective core registers and RAM elements.

Figure 4:
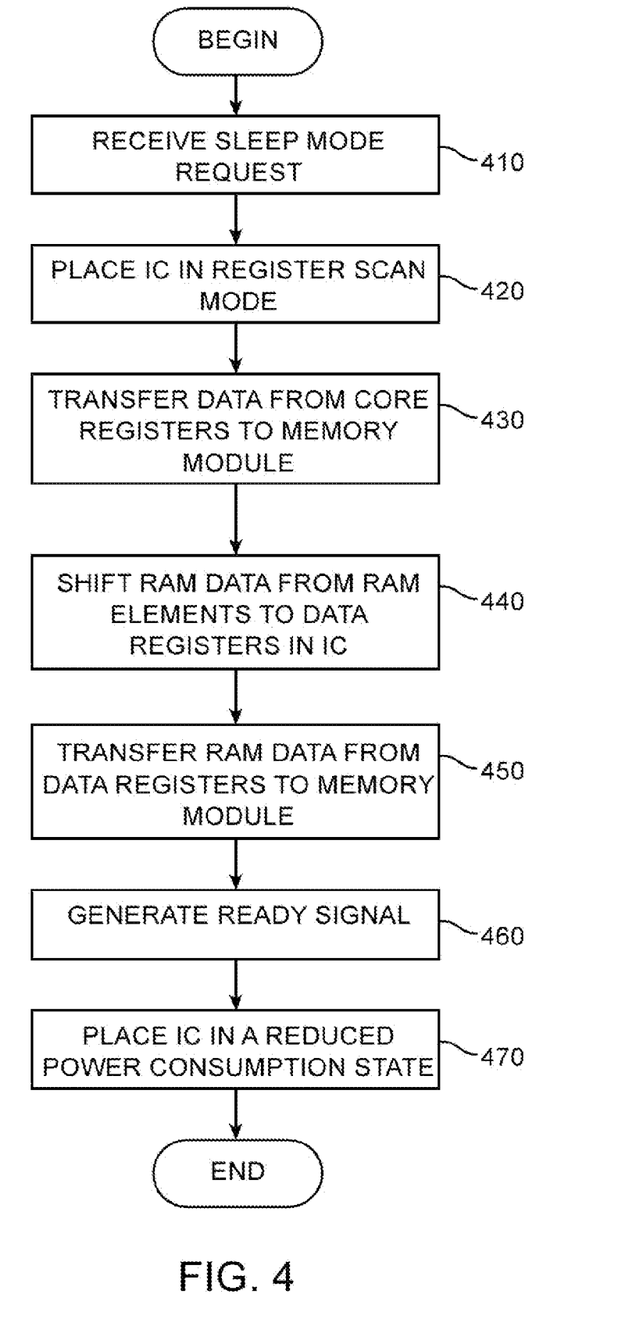
FIG. 4 shows a simplified method for placing an integrated circuit in a reduced power consumption state in accordance with one embodiment of the present invention.

FIG. 4 shows a simplified method for placing an IC in a reduced power consumption state in accordance with one embodiment of the present invention. At step 410, the IC may receive a sleep mode request. The sleep mode request may come in various forms. As an example, the IC may be included in a sensor system and the sleep mode request may be generated within the system after a predefined period of inactivity. As another example, the IC may receive a user input or a control signal that is associated with a sleep mode request to place the IC in a reduced power consumption state. Accordingly, at step 420, the IC is placed in a register scan mode upon receiving the sleep mode request.

In one embodiment, the IC may be similar to IC 200 of FIG. 2 and as such, may include different sets of interconnects or metal traces that connect core registers 208 differently, depending on the mode of operation of IC 200. For instance, prior to receiving the sleep mode request, the IC may be operating in a user mode and upon receiving the sleep mode request, the IC may be switched from the user mode to a scan mode. When the IC is in the scan mode, scan traces (e.g., scan traces 202) within the IC may be engaged to couple core registers in the IC to form multiple register chains (as depicted in FIG. 2).

At step 430, data from core registers are transferred to a memory module. In one embodiment, the data from core registers include state information of the IC. The data may be shifted out through the register scan chains to the memory module. At step 440, data from RAM elements on the IC may be shifted to data registers on the IC. In the embodiment of FIG. 2, for instance, RAM data may be shifted from RAM elements 218 to data registers 120. The data may then be transferred from the data registers to the memory module at step 450.

If desired, the data (either from the core registers or the RAM elements, or both) may be encrypted or compressed before being transmitted to and stored in the memory module. A ready signal may be generated at step 460 once all data have been transferred to the memory module. In one embodiment, the ready signal may be asserted by control circuitry on the IC (e.g., control circuitry 108 of FIGS. 1-3) to indicate that the IC is ready to be placed in a dormant state. Accordingly, at step 470, the IC is placed in a reduced power consumption state.

Figure 5:
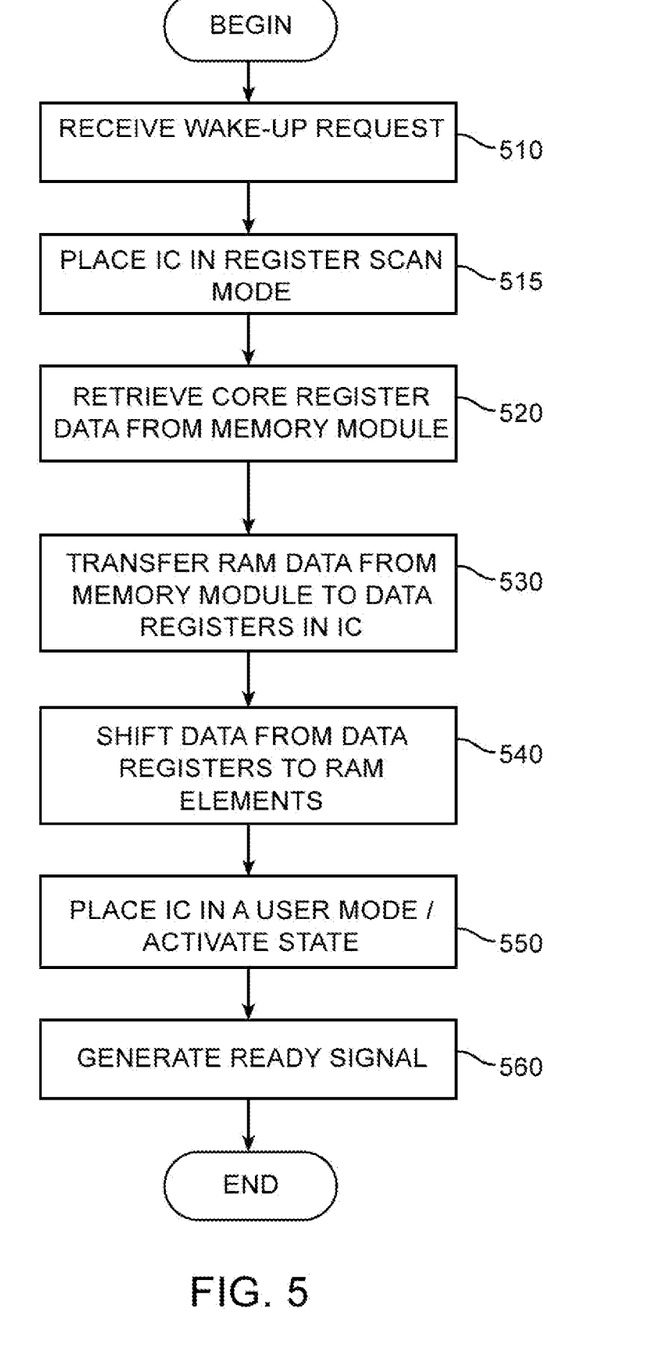
FIG. 5 shows an illustrative method for placing an integrated circuit in an active state in accordance with one embodiment of the present invention.

The IC may thus remain in the reduced power consumption state (or dormant state) until the IC is reactivated, or until the IC receives a signal to be activated. FIG. 5 shows an illustrative method for placing an IC in an active state in accordance with one embodiment of the present invention. As mentioned, the IC may receive a signal to indicate that the system is being reactivated. In the embodiment of FIG. 5, while in sleep mode, the IC may receive a wake-up request signal at step 510.

Upon receiving the wake-up request signal, the IC may be placed in a register scan mode at step 515 before its previous known state is restored. It should be noted that step 515 may be omitted if the IC has already been placed in the register scan mode (e.g., the IC was placed in the register scan mode prior to being placed in a dormant state). At step 520, core register data may be retrieved from the memory module and restored to core registers on the IC. If the core register data were encrypted (or compressed) before being stored in the memory module, the encrypted core register data (or compressed data) may be decrypted (or decompressed) before being restored to the core registers. At step 530, RAM data may be transferred from the memory module to data registers on the IC. As shown in FIG. 2, RAM data stored in memory module 105 may be transferred to data registers 120 through control circuitry 108 and data/address lines 212.

The RAM data may then be shifted from the data registers to the RAM elements on the IC at step 540. The IC is placed in an active state at step 550 after all the core register data and RAM data have been restored to the core registers and RAM elements, respectively. Generally, the IC may consume more power when in the active state compared to when it is in the reduced power consumption or dormant state.

At step 560, the IC may generate a ready signal. In one embodiment, the IC may be switched back from a register scan mode to a user mode and the ready signal may be generated after the IC has been placed in the user mode. At this stage, the IC may have been restored to its previous known state and may continue operating from that particular state. It should be appreciated that even though specific steps are shown in FIGS. 4 and 5, certain steps (e.g., steps 440-460 and steps 530-540) in the methods shown in FIGS. 4 and 5 may be omitted if desired.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method of operating an integrated circuit, comprising:
  receiving a sleep mode request at the integrated circuit, wherein the integrated circuit includes a plurality of registers that stores state information when the integrated circuit is in a user mode and configuration memory that stores configuration data in the user mode;
  configuring the plurality of registers to operate as a scan chain in response to receiving the sleep mode request;
  retrieving integrated circuit state information stored in the plurality of registers by operating the scan chain;
  retrieving the configuration data from the configuration memory;
  storing the retrieved integrated circuit state information and the retrieved configuration data in a memory module; and
  placing the integrated circuit in a sleep mode to reduce power consumption of the integrated circuit.

2. The method defined in claim 1, wherein the plurality of registers is arranged in a two-dimensional array having a plurality of rows and columns, and wherein configuring the plurality of registers to operate as the scan chain comprises:
  coupling the plurality of registers to form the scan chain prior to retrieving the integrated circuit state information.

3. The method defined in claim 2, wherein retrieving the integrated circuit state information comprises:
  shifting data from each register in the plurality of registers using the scan chain.

4. The method defined in claim 1, wherein the integrated circuit further includes a plurality of random access memory (RAM) elements and an additional plurality of registers, the method further comprising storing RAM data stored in the plurality of RAM elements in the memory module prior to placing the integrated circuit in the sleep mode, the steps for storing the RAM data comprising:
  storing the RAM data in one or more registers of the additional plurality of registers;
  retrieving the RAM data stored in the one or more registers of the additional plurality of registers; and
  storing the retrieved RAM data in the memory module.

5. The method defined in claim 4 further comprising:
  compressing the RAM data prior to storing the RAM data in the memory module, wherein the RAM data is compressed using compression circuitry that is part of the integrated circuit.

6. The method defined in claim 4, wherein the memory module is a non-volatile memory module, the method further comprising:
  encrypting the retrieved integrated circuit state information prior to storing the retrieved integrated circuit state information in the memory module; and
  encrypting the retrieved RAM data prior to storing the retrieved RAM data in the memory module,
  wherein the retrieved integrated circuit state information and the retrieved RAM data is encrypted using encryption circuitry that is part of the integrated circuit.

7. The method defined in claim 1 further comprising:
  while the integrated circuit is in the sleep mode, receiving a wake up request with control circuitry on the integrated circuit;
  in response to receiving the wake up request, restoring the plurality of registers with the stored integrated circuit state information by retrieving the stored integrated circuit state information from the memory module; and
  placing the integrated circuit in active mode when the stored integrated circuit state information has been restored in the plurality of registers, wherein the integrated circuit consumes more power in the active mode compared to the sleep mode.

8. The method defined in claim 1 further comprising:
  generating an asserted ready signal when the integrated circuit state information has been stored in the memory module, wherein the integrated circuit is placed in the sleep mode in response to the assertion of the control signal.

9. A method of operating an integrated circuit, the method comprising:
with control circuitry on the integrated circuit, switching the integrated circuit from a first operating mode to a second operating mode;
coupling a plurality of core registers on the integrated circuit to form a chain of core registers when the integrated circuit is switched to the second operating mode;
with the control circuitry, shifting core register data from the chain of core registers to a memory module;
shifting random access memory data from a plurality of random access memory blocks to a plurality of data registers in the integrated circuit;
transmitting the random access memory data from the plurality of data registers to the memory module; and
placing the integrated circuit in a reduced power consumption state after the core register data has been shifted to the memory module.

10. The method defined in claim 9, wherein the first operating mode comprises a user mode and the second operating mode comprises a scan mode, the method further comprising:
with the control circuitry, receiving a sleep mode request for the integrated circuit prior to switching the integrated circuit from the first operating mode to the second operating mode.

11. The method defined in claim 9 further comprising:
while the integrated circuit is in the reduced power consumption state, receiving an asserted active signal with the control circuitry;
in response to receiving the asserted active signal, retrieving the core register data from the memory module,
restoring the retrieved core register data to the chain of core registers;
placing the integrated circuit in active state when the retrieved core register data have been restored to the chain of core registers, wherein the integrated circuit consumes more power in the active state compared to the reduced power consumption state; and
switching the integrated circuit from the second operating mode to the first operating mode.

12. The method defined in claim 11 further comprising:
in response to receiving the asserted active signal, further retrieving the random access memory data from the memory module with the control circuitry, wherein the retrieved random access memory data is transmitted to the plurality of data registers; and
restoring the random access memory data from the plurality data registers to the plurality of random access memory blocks prior to placing the integrated circuit in the active state.

13. The method defined in claim 11 further comprising:
generating an asserted ready signal when the integrated circuit has been switched from the second operating mode to the first operating mode.

14. The method defined in claim 11, wherein the core register data comprise a previous known state of the integrated circuit, wherein the previous known state is restored to the plurality of core registers when the retrieved core register data is restored to the chain of core registers.

15. An integrated circuit comprising:
a plurality of registers in a core region of the integrated circuit;
a plurality of interconnects, each of which is selectively activated to couple registers in the plurality of registers to form a plurality of register chains in response to receiving a sleep mode request;
control circuitry coupled to each register chain in the plurality of register chains through the plurality of interconnects, wherein
an external memory module is coupled to the control circuitry, and wherein register data is shifted from each register chain of the plurality of register chains to the external memory module through the control circuitry when the integrated circuit is being placed in a dormant state.

16. The integrated circuit defined in claim 15 further comprising:
compression circuitry that is coupled to the external memory module and that is configured to compress the register data prior to the integrated circuit being placed in the dormant state.

17. The integrated circuit defined in claim 15 further comprising:
a plurality of random access memory blocks; and
a plurality of data registers coupled to the plurality of random access memory blocks and coupled to the control circuitry, wherein random access memory data from the plurality of random access memory blocks is shifted to the plurality of registers prior to being shifted to the external memory module when the integrated circuit is being placed in the dormant state.

18. The integrated circuit defined in claim 15, wherein the plurality of register chains comprises a plurality of scan chains coupled to the control circuitry.

19. The integrated circuit defined in claim 15 wherein the control circuitry places the integrated circuit in a reduced power consumption state when the integrated circuit is placed in the dormant state.

20. The method defined in claim 1, wherein the configuration data is used to configure logic elements in a core logic region of the integrated circuit in the user mode, and wherein retrieving the configuration data from the configuration memory comprises loading the configuration data from the configuration memory to a data register.

* * * * *